(12) United States Patent
Bialer et al.

(10) Patent No.: US 11,320,515 B2
(45) Date of Patent: May 3, 2022

(54) DETECTION WITH MULTIPATH REFLECTION ELIMINATION IN MULTI-INPUT MULTI-OUTPUT RADAR SYSTEM

(71) Applicant: GM Global Technology Operations LLC, Detroit, MI (US)

(72) Inventors: Oded Bialer, Petah Tivak (IL); Amnon Jonas, Herzliya (IL)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 224 days.

(21) Appl. No.: 16/854,277

(22) Filed: Apr. 21, 2020

(65) Prior Publication Data
US 2021/0325510 A1    Oct. 21, 2021

(51) Int. Cl.
| | |
|---|---|
| G01S 7/35 | (2006.01) |
| G01S 13/931 | (2020.01) |
| G01S 13/58 | (2006.01) |

(52) U.S. Cl.
CPC .......... *G01S 7/354* (2013.01); *G01S 13/584* (2013.01); *G01S 13/931* (2013.01); *G01S 7/356* (2021.05)

(58) Field of Classification Search
CPC ...... G01S 7/354; G01S 13/584; G01S 13/931; G01S 7/356
USPC .......................................................... 342/70
See application file for complete search history.

(56) References Cited

U.S. PATENT DOCUMENTS

| | | | | |
|---|---|---|---|---|
| 5,160,931 A | * | 11/1992 | Brown ................ | G01S 13/9011 342/25 C |
| 5,430,445 A | * | 7/1995 | Peregrim .............. | G01S 13/904 342/25 C |
| 7,259,715 B1 | * | 8/2007 | Garren ................ | G01S 13/9027 342/179 |
| 10,205,457 B1 | * | 2/2019 | Josefsberg ............ | G01S 13/931 |
| 2012/0157851 A1 | * | 6/2012 | Zwirn ................ | G01S 7/52047 600/447 |
| 2015/0293229 A1 | * | 10/2015 | Halmos .................... | G01S 17/90 356/139.04 |

(Continued)

FOREIGN PATENT DOCUMENTS

| | | | | |
|---|---|---|---|---|
| CN | 107613877 A | * | 1/2018 | .......... B06B 1/0215 |
| KR | 20170134605 A | * | 12/2017 | .......... G10K 11/346 |

*Primary Examiner* — Bernarr E Gregory
*Assistant Examiner* — Nuzhat Pervin
(74) *Attorney, Agent, or Firm* — Cantor Colburn LLP

(57) ABSTRACT

Systems and methods include transmitting transmit signals from transmit elements, and receiving reflections resulting from the transmit signals at receive elements. The reflections are processed to obtain range-Doppler maps. Each range-Doppler map corresponds with one combination of the transmit elements and the receive elements. The range-Doppler map includes complex values that indicate intensity over a set of range values and a set of relative velocity values. A synthetic matrix of synthetic vectors of array response combinations is generated for transmit angles and receive angles. Each array response combination is a combination of a transmit response for one of the transmit angles and a receive response for one of the receive angles. Two stages of detection are performed. A first stage identifies potential objects and a second stage eliminates the potential objects that are ghost objects. The potential objects remaining after the second stage are the real objects.

20 Claims, 3 Drawing Sheets

(56) References Cited

U.S. PATENT DOCUMENTS

| | | | |
|---|---|---|---|
| 2016/0157828 A1* | 6/2016 | Sumi | G01N 29/262 |
| | | | 702/189 |
| 2016/0192907 A1* | 7/2016 | Zwirn | G01S 7/52047 |
| | | | 600/443 |
| 2018/0088220 A1* | 3/2018 | Flynn | A61B 8/5276 |
| 2018/0100918 A1* | 4/2018 | Davis | H04L 27/2278 |
| 2019/0346544 A1* | 11/2019 | Hammes | G01S 13/42 |

* cited by examiner

DETECTION WITH MULTIPATH REFLECTION ELIMINATION IN MULTI-INPUT MULTI-OUTPUT RADAR SYSTEM

INTRODUCTION

The subject disclosure relates to detection with multipath reflection elimination in a multi-input multi-output (MIMO) radar system.

Sensors are increasingly used in vehicles (e.g., automobiles, trucks, construction equipment, farm equipment, automated factory equipment) to obtain information about the vehicle and its environment. The information may be used to implement semi-autonomous or autonomous operation of the vehicle, for example. Exemplary sensors include a camera, a radar system, and a lidar system. A MIMO radar system with multiple transmit antenna elements and receive antenna elements increases angular resolution. But, multipath reflections can negatively affect the performance of the MIMO radar system. Accordingly, it is desirable to provide detection with multipath reflection elimination in a multi-input multi-output (MIMO) radar system.

SUMMARY

In one exemplary embodiment, a method includes transmitting transmit signals from two or more transmit elements of a radar system, and receiving reflections resulting from the transmit signals at two or more receive elements of the radar system. The method also includes processing the reflections to obtain range-Doppler maps, each range-Doppler map corresponding with one combination of the two or more transmit elements and the two or more receive elements. The range-Doppler map includes complex values that indicate intensity over a set of range values and a set of relative velocity values. A synthetic matrix of synthetic vectors of array response combinations is generated for transmit angles and receive angles, each array response combination being a combination of a transmit response for one of the transmit angles and a receive response for one of the receive angles. Two stages of detection are performed using the range-Doppler maps and the synthetic matrix to identify real objects, the two stages of detection including a first stage to identify potential objects and a second stage to eliminate the potential objects that are ghost objects resulting from multi-path reflection. The potential objects remaining after the second stage are the real objects. An aspect of an operation of a vehicle is controlled based on the real objects.

In addition to one or more of the features described herein, the processing the reflections includes performing a first fast Fourier transform (FFT) along range values and performing a second FFT on a result of the first FFT.

In addition to one or more of the features described herein, the generating the synthetic matrix of synthetic vectors of array response combinations includes generating the receive response for each receive angle $\theta_{RX}$ as:

$$r(\theta_{RX}) = \begin{bmatrix} e^{j2\pi p_1 \sin(\theta_{RX})/\lambda} \\ \vdots \\ e^{j2\pi p_m \sin(\theta_{RX})/\lambda} \end{bmatrix},$$

where $p_1$ through $p_m$ are positions of the two or more receive elements and $\lambda$ is a wavelength of the transmit signals.

In addition to one or more of the features described herein, the generating the synthetic matrix of synthetic vectors of array response combinations also includes generating the transmit response for each transmit angle $\theta_{TX}$ as:

$$b(\theta_{TX}) = \begin{bmatrix} b_1(\theta_{TX}) \\ \vdots \\ b_n(\theta_{TX}) \end{bmatrix} = \begin{bmatrix} e^{j2\pi z_1 \sin(\theta_{TX})/\lambda} \\ \vdots \\ e^{j2\pi z_n \sin(\theta_{TX})/\lambda} \end{bmatrix},$$

where $z_1$ through $z_n$ are positions of the two or more transmit elements.

In addition to one or more of the features described herein, the generating the synthetic matrix of synthetic vectors for each receive angle $\theta_{RX}$ and each transmit angle $\theta_{TX}$ includes obtaining each synthetic vector as:

$$a(\theta_{TX}, \theta_{RX}) = \begin{bmatrix} b_1(\theta_{TX})r(\theta_{RX}) \\ \vdots \\ b_n(\theta_{TX})r(\theta_{RX}) \end{bmatrix}.$$

In addition to one or more of the features described herein, the performing the first stage of the two stages of detection includes determining whether a beamforming result obtained using the synthetic vector with the transmit angle set equal to the receive angle and a vector x of the range-Doppler maps at each range and Doppler exceeds a detection threshold value. Two or more potential objects are identified at locations corresponding to each range and Doppler for which the beamforming result exceeds the detection threshold value.

In addition to one or more of the features described herein, the method also includes obtaining the beamforming result as:

$$\|a^H(\theta_{TX}^i = \theta_{RX}^i, \theta_{RX}^i) x^i\|, \text{ where}$$

i is an index, a subscript H indicates a Hermitian matrix, and $\| \; \|$ denotes a sum of absolute values in a resulting vector.

In addition to one or more of the features described herein, the performing the second stage of the two stages of detection includes obtaining a candidate pair of the two or more potential objects. A closer one of the candidate pair is a closer one of the two or more potential objects to the radar system and a farther one of the candidate pair is a farther one of the two or more potential objects from the radar system.

In addition to one or more of the features described herein, the performing the second stage further includes determining whether a ratio exceeds a ratio threshold value, a numerator of the ratio being a beamforming result obtained using the synthetic vector with the transmit angle set equal to the receive angle of the closer one of the candidate pair and a vector of the range-Doppler maps at the range and Doppler corresponding to the farther one of the candidate pair, and a denominator of the ratio being a beamforming result obtained using the synthetic vector with the transmit angle set equal to the receive angle of the farther one of the candidate pair and a vector of the range-Doppler maps at the range and Doppler corresponding to the farther one of the candidate pair.

In addition to one or more of the features described herein, the beamforming result of the numerator is given by:

$$\|a^H(\theta_{TX}=\theta_{RX}^c,\theta_{RX}^f)x^c\|$$

and the beamforming result of the denominator is given by:

$$\|a^H(\theta_{TX}=\theta_{RX}^f,\theta_{RX}^f)x^f\|, \text{ where}$$

a subscript c indicates the closer one of the candidate pair, and a subscript f indicates the farther one of the candidate pair.

In another exemplary embodiment, a system in a vehicle includes two or more transmit elements of a radar system configured to emit transmit signals, and two or more receive elements of the radar system configured to receive reflections resulting from the transmit signals. The system also includes processing circuitry to process the reflections to obtain range-Doppler maps, each range-Doppler map corresponding with one combination of the two or more transmit elements and the two or more receive elements. The range-Doppler map includes complex values that indicate intensity over a set of range values and a set of relative velocity values. The processing circuitry generates a synthetic matrix of synthetic vectors of array response combinations for transmit angles and receive angles, each array response combination being a combination of a transmit response for one of the transmit angles and a receive response for one of the receive angles, and performs two stages of detection using the range-Doppler maps and the synthetic matrix to identify real objects, the two stages of detection including a first stage to identify potential objects and a second stage to eliminate the potential objects that are ghost objects resulting from multi-path reflection. The potential objects remaining after the second stage are the real objects, and an aspect of an operation of a vehicle is controlled based on the real objects.

In addition to one or more of the features described herein, the processing circuitry processes the reflections by performing a first fast Fourier transform (FFT) along range values and performing a second FFT on a result of the first FFT.

In addition to one or more of the features described herein, the processing circuitry generates the synthetic matrix of synthetic vectors of array response combinations by generating the receive response for each receive angle $\theta_{RX}$ as:

$$r(\theta_{RX}) = \begin{bmatrix} e^{j2\pi p_1 \sin(\theta_{RX})/\lambda} \\ \vdots \\ e^{j2\pi p_m \sin(\theta_{RX})/\lambda} \end{bmatrix},$$

where $p_1$ through $p_m$ are positions of the two or more receive elements and $\lambda$ is a wavelength of the transmit signals.

In addition to one or more of the features described herein, the processing circuitry generates the synthetic matrix of synthetic vectors of array response combinations by also generating the transmit response for each transmit angle $\theta_{TX}$ as:

$$b(\theta_{TX}) = \begin{bmatrix} b_1(\theta_{TX}) \\ \vdots \\ b_n(\theta_{TX}) \end{bmatrix} = \begin{bmatrix} e^{j2\pi z_1 \sin(\theta_{TX})/\lambda} \\ \vdots \\ e^{j2\pi z_n \sin(\theta_{TX})/\lambda} \end{bmatrix},$$

$z_1$ through $z_n$ are positions of the two or more transmit elements.

In addition to one or more of the features described herein, the processing circuitry is configured to generate the synthetic matrix of synthetic vectors for each receive angle $\theta_{RX}$ and each transmit angle $\theta_{TX}$ by obtaining each synthetic vector as:

$$a(\theta_{TX}, \theta_{RX}) = \begin{bmatrix} b_1(\theta_{TX})r(\theta_{RX}) \\ \vdots \\ b_n(\theta_{TX})r(\theta_{RX}) \end{bmatrix}.$$

In addition to one or more of the features described herein, the processing circuitry is configured to perform the first stage of the two stages of detection by determining whether a beamforming result obtained using the synthetic vector with the transmit angle set equal to the receive angle and a vector x of the range-Doppler maps at each range and Doppler exceeds a detection threshold value. Two or more potential objects are identified at locations corresponding to each range and Doppler for which the beamforming result exceeds the detection threshold value.

In addition to one or more of the features described herein, the beamforming result is given by:

$$\|a^H(\theta_{TX}^i=\theta_{RX}^i,\theta_{RX}^i)x^i\|, \text{ where}$$

i is an index, H indicates a Hermitian matrix, and $\| \|$ denotes a sum of absolute values in a resulting vector.

In addition to one or more of the features described herein, the processing circuitry is configured to perform the second stage of the two stages of detection by obtaining a candidate pair of the two or more potential objects. A closer one of the candidate pair is a closer one of the two or more potential objects to the radar system and a farther one of the candidate pair is a farther one of the two or more potential objects from the radar system.

In addition to one or more of the features described herein, the processing circuitry is configured to perform the second stage by determining whether a ratio exceeds a ratio threshold value. A numerator of the ratio is a beamforming result obtained using the synthetic vector with the transmit angle set equal to the receive angle of the closer one of the candidate pair and a vector of the range-Doppler maps at the range and Doppler corresponding to the farther one of the candidate pair. A denominator of the ratio is a beamforming result obtained using the synthetic vector with the transmit angle set equal to the receive angle of the farther one of the candidate pair and a vector of the range-Doppler maps at the range and Doppler corresponding to the farther one of the candidate pair.

In addition to one or more of the features described herein, the beamforming result of the numerator is given by:

$$\|a^H(\theta_{TX}=\theta_{RX}^c,\theta_{RX}^f)x^f\|$$

and the beamforming result of the denominator is given by:

$$\|a^H(\theta_{TX}=\theta_{RX}^f,\theta_{RX}^f)x^f\|, \text{ where}$$

a subscript c indicates the closer one of the candidate pair, and a subscript f indicates the farther one of the candidate pair.

The above features and advantages, and other features and advantages of the disclosure are readily apparent from the following detailed description when taken in connection with the accompanying drawings.

BRIEF DESCRIPTION OF THE DRAWINGS

Other features, advantages and details appear, by way of example only, in the following detailed description, the detailed description referring to the drawings in which.

DETAILED DESCRIPTION

Figure 1:
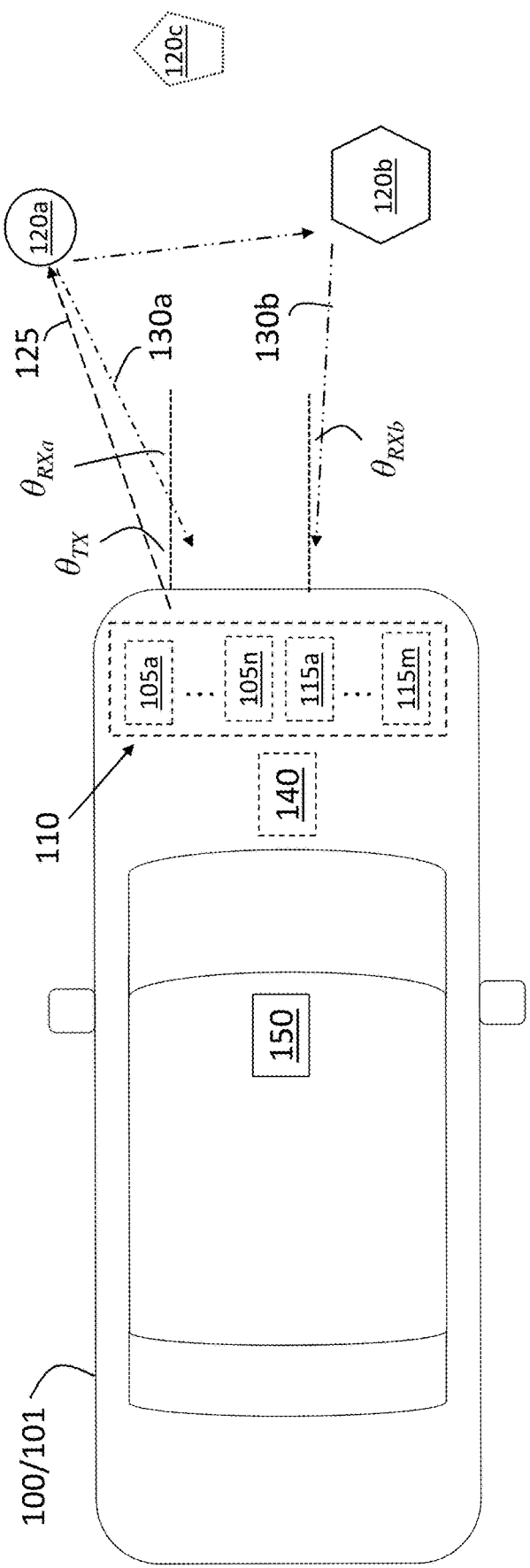
FIG. 1 is a block diagram of a vehicle that includes a multi-input multi-output (MIMO) radar system that implements detection with multipath reflection elimination according to one or more embodiments.

The following description is merely exemplary in nature and is not intended to limit the present disclosure, its application or uses. It should be understood that throughout the drawings, corresponding reference numerals indicate like or corresponding parts and features.

As previously noted, radar systems are among the sensors that may be used in a vehicle or in other applications. A MIMO radar system exhibits improved angular resolution over single input single output (SISO) radar systems, for example. However, multipath reflections can degrade the performance of the MIMO radar system. A direct reflection occurs when energy transmitted from a radar system encounters an object and is reflected directly back to the radar system. A multipath reflection occurs when energy transmitted from a radar system encounters a first object, is reflected to a second object (or more objects), and then is reflected back to the radar system (i.e., the reflection takes multiple paths). When the multipath reflection is processed without knowledge that it is not a direct reflection, the reflection may appear to have come from a non-existent (i.e., ghost) object at a range and angle commensurate with the multipath reflection being treated as a direct reflection. Embodiments of the systems and methods detailed herein relate to detection with multipath reflection elimination in a multi-input multi-output (MIMO) radar system.

In accordance with an exemplary embodiment, FIG. 1 is a block diagram of a vehicle 100 that includes a MIMO radar system 110 that implements detection with multipath reflection 130b elimination. The exemplary vehicle 100 shown in FIG. 1 is an automobile 101. The exemplary MIMO radar system 110 is shown with transmit elements 105a through 105n (generally referred to as 105) and receive elements 115a through 115m (generally referred to as 115). Two exemplary objects 120a and 120b (generally referred to as 120) are shown in the field of view of the MIMO radar system 110. A transmit signal 125 reaches the object 120a, which reflects some of the transmit energy as a direct reflection 130a. The object 120a also reflects some of the transmit energy to the object 120b, which reflects some energy back to the MIMO radar system 110 as a multipath reflection 130b, as indicated.

The MIMO radar system 110 performs object detection by processing all received reflected energy to estimate where an object 120 might have been to result in the reflected energy. As the exemplary direct reflection 130a and multipath reflection 130b (generally referred to as 130) indicate, the direct path taken by the direct reflection 130a is shorter than the path taken by the multipath reflection 130b. If the multipath reflection 130b is not properly identified and is, instead, processed as a mistaken direct reflection 130, then the MIMO radar system 110 may incorrectly perceive a ghost object 120c as the source of the mistaken direct reflection 130. Accordingly, detection that eliminates the multipath reflection 130b facilitates more accurate object detection. As FIG. 1 indicates, the transmit angle $\theta_{TX}$ of the transmit signal 125 and the receive angle $\theta_{RXa}$ of the direct reflection 130a are similar, while the receive angle $\theta_{RXb}$ of the multipath reflection 130b is different than the transmit angle $\theta_{TX}$. This difference, which is generally true for all direct reflections 130a and multipath reflections 130b, is used to detect real objects 120, as further detailed.

The vehicle 100 includes a controller 140. The controller 140 may obtain information from the MIMO radar system 110, as well as from other sensors 150 (e.g., cameras, lidar system). The controller 140 may also process data received by the MIMO radar system 110, alone or in conjunction with a controller within the MIMO radar system 110. The controller 140 and any controller within the MIMO radar system 110 includes processing circuitry that may include an application specific integrated circuit (ASIC), an electronic circuit, a processor (shared, dedicated, or group) and memory that executes one or more software or firmware programs, a combinational logic circuit, and/or other suitable components that provide the described functionality.

Figure 2:
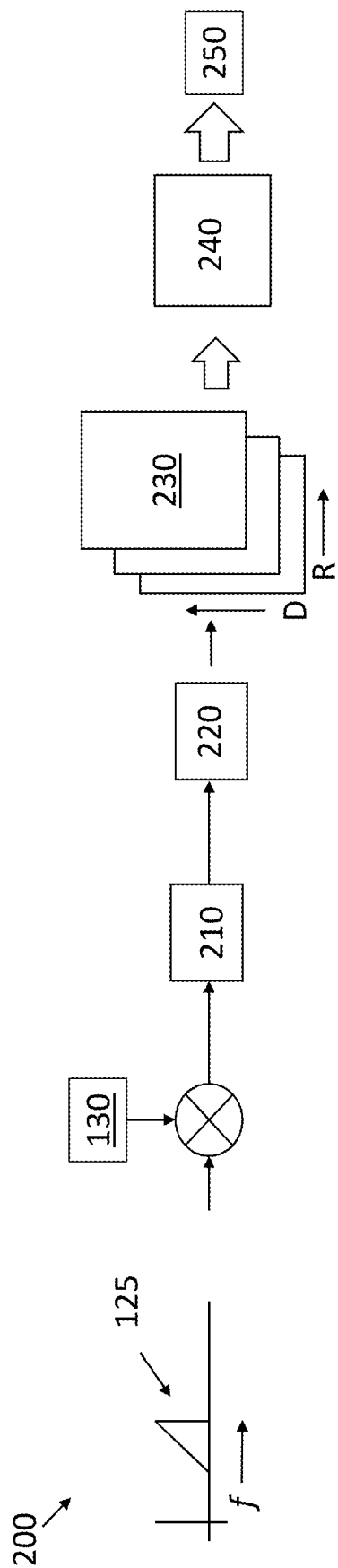
FIG. 2 is a process flow of a method of processing reflected signals to facilitate detection with multipath reflection elimination according to one or more embodiments.

FIG. 2 is a process flow of a method 200 of processing reflected signals 130 in order to facilitate detection with multipath reflection 130b elimination according to one or more embodiments. Continuing reference is made to FIG. 1. The processes shown in FIG. 2 are used to facilitate a matched filter correlation between the transmit signal 125 and a received reflection 130. In a MIMO radar system 110, the transmit signal 125 is typically a linear frequency-modulated continuous wave (LFMCW) signal, referred to as a chirp. As the name suggest, the chirp exhibits a linear increase, as shown, or a decrease in frequency f over the duration of the chirp. Each transmit element 105 transmits a number of chirps. The transmit signal 125 from each transmit element 105 may be separated in time (i.e., time division multiple access) or each transmit signal 125 may exhibit a different frequency range for the chirp in order to distinguish the transmissions from the different transmit elements 105.

Processing of received reflections 130 may differ based on the transmission scheme. The transmit elements 105 may transmit in turn according to a time division multiple access (TDMA) scheme. The transmit signal 125 transmitted by each transmit element 105 may differ in an amount of frequency shift according to a frequency division multiple access (FDMA) scheme. Each transmit element 105 may transmit a differently coded transmit signal 125 according to a code division multiple access scheme (CDMA). The transmit elements 105 may transmit simultaneously using the FDMA or CDMA schemes. According to the TDMA and FDMA schemes, processing of the reflections 130 is typically done on a per-transmit element 105 basis for each receive element 115. Although transmit element 105 and receive element 115 are used for explanatory purposes, the number of transmit channels may be less than the number of transmit elements 105, and the number of receive channels may be less than the number of receive elements 115. In that case, the processing would be done on a per receive channel and transmit channel basis. Per transmit element 105 and per transmit signal 125, the transmit signal 125 is mixed with a received reflection 130. The result undergoes a fast Fourier transform (FFT) with respect to range (referred to as a range FFT), at block 210. The result of the range FFT, at block 210, is an indication of energy distribution across detectable ranges for each transmit signal 125 that is transmitted by the given transmit element 105. The ranges may be grouped as range bins. Thus, there is a different range FFT associated with each receive element 115 and each transmit element 105 for each transmit signal 125, and the total number of range FFTs is a product of the total number of transmit signals 125 and the number of receive elements 115.

At block 220, a second FFT (referred to as a Doppler FFT) is performed on the range FFT result (at block 210). That is, an FFT is performed per range bin along the first FFT result. The result indicates relative radial velocity which may be grouped into Doppler bins. The Doppler FFT provides a range-Doppler map per transmit element 105 and receive element 115 pair. For each receive element 115 and transmit element 105 pair, all the chirps are processed together for each range bin of the range-chip map (obtained with the range FFT). The result of the Doppler FFT at block 220 is the range-Doppler map 230, which indicates the relative radial velocity D of each detected object 120 along with its range R for a given transmit element 105 and receive element 115 pair. The number of Doppler FFTs is a product of the number of range bins and the number of receive elements 115 (or receive channels). In the case of a CDMA scheme being used rather than TDMA or FDMA, the range FFT is performed per receive element 115 (or receive channel) rather than per receive element 115 and transmit element 105 pair. However, the end result of the two FFTs is still the same number of range-Doppler maps 230. This range-Doppler map 230 that indicates an intensity at each range R and Doppler D combination is the matched filter result. The intensity is a complex value and, as previously noted, the range-Doppler map 230 is obtained for each transmit element 105 and receive element 115 pair. Thus, for a MIMO radar system 110 with three transmit elements 105 and three receive elements 115, nine range-Doppler maps 230 obtained will be obtained.

At block 240, a detection process is performed using the range-Doppler maps 230. As detailed with reference to FIG. 3, the detection process to eliminate objects 120 associated with multipath reflections 130b is performed in two stages. The result of the detection, at block 240, is used at block 250. At block 250, the controller 140 of the vehicle 100 may initiate semi-autonomous or autonomous operation of the vehicle 100 based on the location of objects 120 detected at block 240.

Generally, detection involves a beamforming process to detect one or more objects 120 based on the range-Doppler maps 230. According to a prior beamforming technique, a synthetic matrix is generated for every potential angle-of-arrival (AOA) of a reflection 130 from an object 120. The synthetic matrix is multiplied by a vector x associated with each range bin in the range-Doppler maps 230. A threshold is applied to a result of the multiplication. A range and AOA associated with a result that exceeds the threshold is regarded as a range and AOA of a detected object 120. However, as previously noted, this prior beamforming treats all received reflections 130 as direct. Thus, the prior beamforming technique may result in the detection of ghost objects 120c and subsequent incorrect semi-autonomous or autonomous operation of the vehicle 100. For example, maneuvers may be implemented to avoid something that is not actually present. According to one or more embodiments, the detection at block 240 involves the generation of a different beamforming matrix A that includes a transmit angle in addition to potential AOAs. In addition, a different subset of the beamforming matrix A is used, as detailed with reference to FIG. 3, at two different stages of detection. The generation of the beamforming matrix A is discussed first.

To generate the beamforming matrix A, one set of synthetic arrays relates to the receive elements 115. Specifically, for each candidate receive angle $\theta_{RX}$, a vector $r(\theta_{RX})$ of receive array responses is obtained as:

$$r(\theta_{RX}) = \begin{bmatrix} e^{j2\pi p_1 \sin(\theta_{RX})/\lambda} \\ \vdots \\ e^{j2\pi p_m \sin(\theta_{RX})/\lambda} \end{bmatrix} \quad [\text{EQ. 1}]$$

In EQ. 1, $p_i$ refers to the position of the antenna of the $i^{th}$ receiver element 115. The wavelength $\lambda$ is the wavelength corresponding with the start of the chirp (i.e., the initial frequency) since the transmit signal 125 may be a chirp that includes a range of frequency values and, correspondingly, a range of wavelength values. For a given candidate receive angle $\theta_{RX}$, the vector $r(\theta_{RX})$ represents the phase differences between a detected object 120 and each of the receive elements 115 and, specifically, their antennas. For an exemplary case with three receive elements 115 that are all operating (i.e., three receive channels), the vector $r(\theta_{RX})$ has three elements.

Another set of synthetic arrays relates to the transmit elements 105. Specifically, for each candidate transmit angle $\theta_{TX}$, a vector $b(\theta_{TX})$ of transmit array responses is obtained as:

$$b(\theta_{TX}) = \begin{bmatrix} b_1(\theta_{TX}) \\ \vdots \\ b_n(\theta_{TX}) \end{bmatrix} = \begin{bmatrix} e^{j2\pi z_1 \sin(\theta_{TX})/\lambda} \\ \vdots \\ e^{j2\pi z_n \sin(\theta_{TX})/\lambda} \end{bmatrix} \quad [\text{EQ. 2}]$$

In EQ. 2, $z_i$ refers to the position of the antenna of the $i^{th}$ transmit element 105. For a given candidate transmit angle $\theta_{TX}$, the vector $b(\theta_{TX})$ represents the phase differences between a detected object 120 and each of the transmit elements 105 and, specifically, their antennas. For an exemplary case with three transmit elements 105 that are all operating (i.e., three transmit channels), the vector $b(\theta_{TX})$ has three elements.

The transmit and receive array responses may be combined as:

$$a(\theta_{TX}, \theta_{RX}) = \begin{bmatrix} b_1(\theta_{TX})r(\theta_{RX}) \\ \vdots \\ b_n(\theta_{TX})r(\theta_{RX}) \end{bmatrix} \quad [\text{EQ. 3}]$$

That is, for each combination of candidate angles $\theta_{TX}$ and $\theta_{RX}$, each element $b_i(\theta_{TX})$ of the transmit array response vector $b(\theta_{TX})$ is multiplied by the receive array response vector $r(\theta_{RX})$. Thus, for an exemplary case with three transmit elements 105 and three receive elements 115 and for a given $\theta_{TX}$ and $\theta_{RX}$ pair, the vector $a(\theta_{TX}, \theta_{RX})$ has nine elements. The elements of the vector are complex values that indicate phase and amplitude. That is, the beamforming matrix A for every $\theta_{TX}$ and $\theta_{RX}$ pair is given by:

$$A = [a(\theta_{TX}^1, \theta_{RX}^1) a(\theta_{TX}^2, \theta_{RX}^2) \ldots] \quad [\text{EQ. 4}]$$

In EQ. 4, the superscript indicates an index for the $\theta_{TX}$ and $\theta_{RX}$ pair rather than a power. Also, the same superscript does not indicate the same angle (i.e., $\theta_{TX}^1$ is not necessarily the same angle as $\theta_{RX}^1$). Each vector a is a column vector that has a number of elements equal to a multiple of the number of transmit elements 105 (or transmit channels) and the number of receive elements 115 (or receive channels). For the exemplary case of three transmit elements 105 and three receive elements 115, the number of elements of each vector a in the beamforming matrix A is nine. A matrix $A_{direct}$, which is a subset of the beamforming matrix A, can be obtained for the special case of $\theta_{TX}$ being the same angle as $\theta_{RX}$ for each given $\theta_{RX}$. The matrix $A_{direct}$ is given by:

$$A_{direct}=[a(\theta_{TX}^1=\theta_{RX}^1,\theta_{RX}^1)a(\theta_{TX}^2=\theta_{RX}^2,\theta_{RX}^2)\ldots] \quad [\text{EQ. 5}]$$

Figure 3:
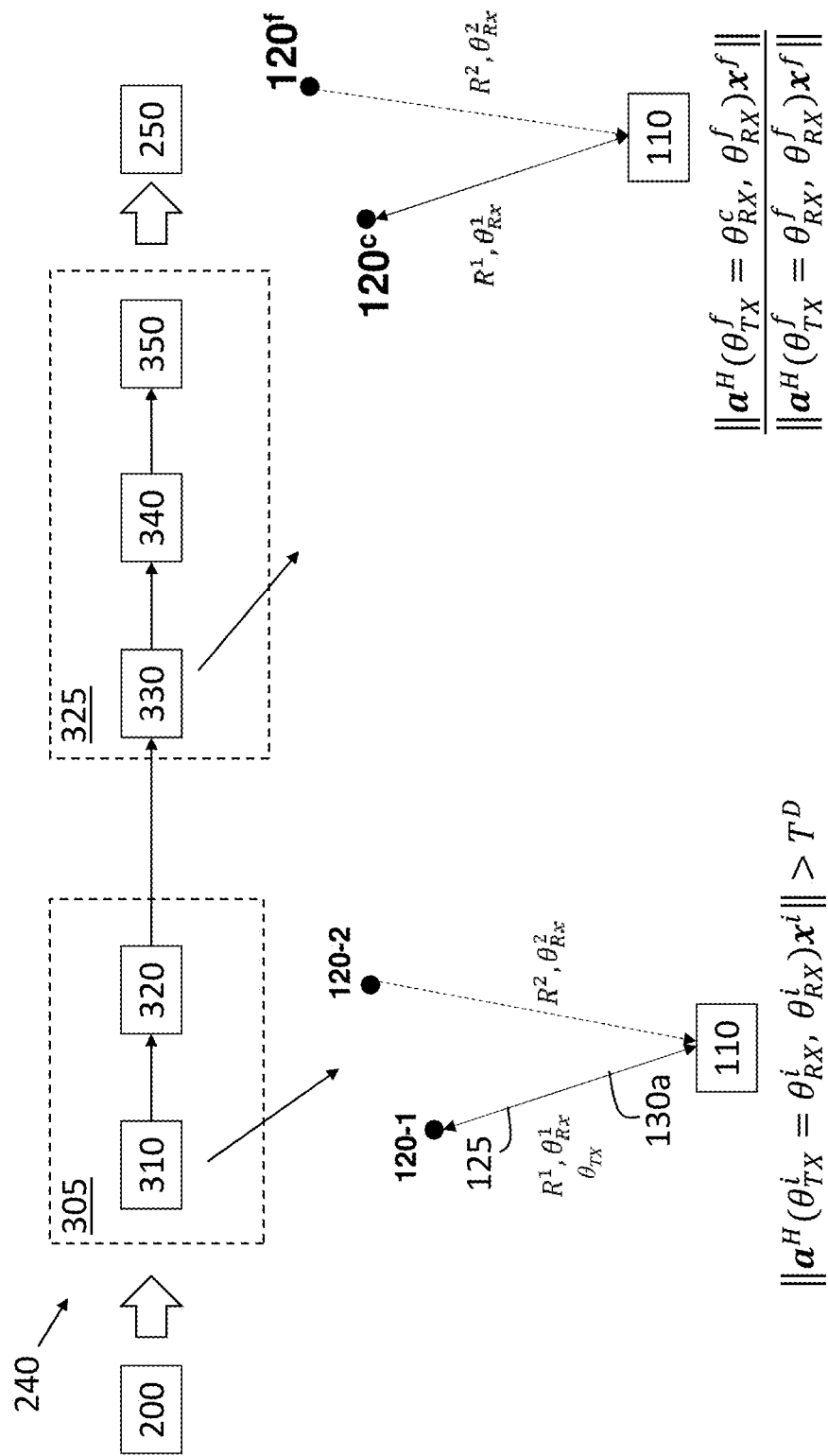
FIG. 3 is a process flow detailing the processes at block 240 of FIG. 2.

FIG. 3 is a process flow detailing the processes, at block 240, to perform detection with multipath reflection 130b elimination according to one or more embodiments. Continuing reference is made to FIGS. 1 and 2. As shown, two stages, at blocks 305 and 325, are part of the detection at block 240. Specifically, block 305 pertains to detection of potential objects 120 and block 325 pertains to multipath reflection 130b elimination (i.e., the elimination of some of the potential objects as being ghost objects), as detailed.

As part of the first stage at block 305, detection is limited to objects 120 that are likely to result from a direct path 130a. Specifically, at block 310, a direct path is assumed (i.e., $\theta_{TX}=\theta_{RX}$), and it is determined if a beamforming result exceeds a threshold value. The beamforming result that is obtained at block 310 is given by:

$$y=\|A_{direct}^H x\| \quad [\text{EQ. 6}]$$

As EQ. 5 indicates, $A_{direct}$ is a subset of the beamforming matrix A and is based on the assumption of a real object 120 (i.e., that the transmit angle $\theta_{TX}$ and the receive angle $\theta_{RX}$ are the same). The superscript H indicates a Hermitian matrix, and the notation $\|q\|$ indicates the sum of the absolute value of the elements in vector q (norm 1 of vector q). The vector x is obtained from the range-Doppler maps 230. Each vector x is the vector of the complex values at a given range bin and Doppler bin of each of the range-Doppler maps 230. At block 320, any x vector (i.e., a range bin and Doppler bin) for which beamforming result exceeds a detection threshold $T^D$ is retained as corresponding with the location of a potential object 120.

Two exemplary objects 120-1 and 120-2 are shown in FIG. 3. Object 120-1 may be a real like the real object 120a in FIG. 1, and object 120-2 may be a ghost like the ghost object 120c in FIG. 1. The range R and angle θ corresponding with each object 120 is indicated. The superscripts indicate an index rather than a power (e.g., $R^2$ is the range to the ghost object 120-2). As indicated, the transmit angle $\theta_{TX}$ and receive angle $\theta_{RX}^1$ from the object 120-1 are the same. This is because the object 120-1 results from a direct reflection 130a and is real (like object 120a in FIG. 1). Some transmitted energy reflects from the real object 120-1 to another reflector (like object 120b in FIG. 1) and ultimately back to the radar system 110. This is a multipath reflection 130b as shown in FIG. 1. Because of the longer path taken by the multipath reflection 130b, as compared with the direct reflection 130a, the reflector appears as a ghost object 120-2 (like object 120c in FIG. 1) at a range $R^2$ that is farther from the radar system 110 than the reflector that resulted in the multipath reflection 130b and the real object 120-1 that caused the multipath reflection 130b. At block 305, for each of these objects 120-1 and 120-2, a detection is only declared at block 320 if the beamforming result obtained at block 310 exceeds a threshold:

$$\|a^H(\theta_{TX}^i=\theta_{RX}^i,\theta_{RX}^i)x^i\|>T^D \quad [\text{EQ. 7}]$$

That is, for index i=1 and for i=2 in the exemplary case, beamforming is performed assuming a direct path (i.e., $\theta_{TX}^i=\theta_{RX}^i$) according to EQ. 7.

For the real object 120-1, the assumption of a direct path is correct. Thus, the beamforming result will likely exceed the detection threshold $T^D$. However, for the ghost object 120-2, the assumption of a direct path is incorrect. Thus, the beamforming result may not exceed the detection threshold $T^D$. As a result, the threshold test at block 320, based on EQ. 7, may be used to preclude one or more ghost objects 120 from being detected at all. Specifically, any object 120 for which the beamforming result (obtained at block 310) does not exceed the detection threshold $T^D$ (obtained at block 320) is not considered further. Even if a ghost object 120 is detected at this first stage at block 305, a second stage at block 325 is implemented to identify objects 120 that result from multipath reflections 130b (i.e., that are ghosts).

The test at the second stage at block 325 is based on the fact that the range $R^2$ of the ghost object 120-2 will be farther than the real object 120-1 that caused it. For example, in FIG. 1, the real object 120a that reflects some energy to object 120b and, thus, results in the detection of a ghost object 120c will be closer in range than the ghost object 120c. Thus, the test at block 325 considers the objects 120 that were detected at block 305 one pair at a time based on their ranges. The test uses a fact illustrated in FIG. 1 for the pair of objects 120a and 120c. The transmit angle $\theta_{TX}$ and the receive angle $\theta_{RXa}$ are the same for a real object 120a. However, in the case of a ghost object 120c, the transmit angle $\theta_{TX}$ is not the same as the receive angle $\theta_{RXb}$ but, instead, the transmit angle $\theta_{TX}$ is equal to the receive angle $\theta_{RXa}$ of the closer, real object 120a that resulted in the ghost object 120c.

As part of the processing at block 325, relative ranges are examined at block 330 and ratios are calculated at block 340. At block 330, the range $R^i$ to each object 120i (detected at the first stage at block 305) is used to determine the closest to farthest objects 120 from the radar system 110. At block 340, for each pair of a closer object 120c, denoted by superscript "c," and a farther object 120f, denoted by superscript "f," a ratio of beamforming results is calculated. Specifically, a ratio of beamforming results is obtained using subsets of the beamforming matrix A and the vector $x^f$ corresponding with the farther object 120 of the pair. The vector $x^f$ used to obtain the beamforming result in both the numerator and the denominator is generated from the range R and Doppler D of the farther object 120f in all of the range-Doppler maps 230.

For the subset of the beamforming matrix A, the transmit angle $\theta_{TX}$ is assumed to be the same as the receive angle $\theta_{RX}^c$ of the closer object 120 in the numerator and is assumed to be the same as the receive angle $\theta_{RX}^f$ of the farther object 120 in the denominator. Also in the subset of the beamforming matrix A, the receive angle $\theta_{RX}$ is assumed to be the same as the receive angle $\theta_{RX}^f$ of the farther object 120 of the pair. As previously noted, if the farther object 120f is a ghost and is caused by the closer object 120c, then using the receive angle $\theta_{RX}^c$ of the closer object 120c as the transmit angle $\theta_{TX}$ (as in the numerator) will produce a larger beamforming result than using the receive angle $\theta_{RX}^f$ of the farther object 120f as the transmit angle $\theta_{TX}$ (as in the denominator). The result would be the opposite if the farther object 120f were real (i.e., the denominator would be a larger value than the numerator). Thus, the ratio is a larger value when the farther object 120f is a ghost, as compared with when the farther object 120f is real.

At block 340, the ratio of beamforming results is compared with a ratio threshold $T_h^R$:

$$\frac{\|a^H(\theta_{TX} = \theta_{RX}^c, \theta_{RX}^f)x^f\|}{\|a^H(\theta_{TX} = \theta_{RX}^f, \theta_{RX}^f)x^f\|} > T_h^R \quad \text{[EQ. 8]}$$

As previously noted, if the farther object $120^f$ is a ghost, then the numerator is a larger result than the denominator and the ratio may exceed the ratio threshold $T_h^R$. If the farther object $120^f$ is real, then the denominator is a larger result than the numerator and the ratio will likely not exceed the ratio threshold $T_h^R$. Thus, if the ratio exceeds the ratio threshold $T_h^R$, the farther object $120^f$ is eliminated as a ghost, at block 350.

Optionally, the efficiency of the second stage at block 325 may be improved based on the respective ranges $R^c$ and $R^f$ of the closer and farther potential objects 120. For an exemplary pair, if the closer object $120^c$ is closer to the radar system 110 than the farther object $120^f$ by a predefined amount (i.e., the distance from the closer object $120^c$ to the farther object $120^f$ is greater than some specified amount), then it is unlikely that the closer object $120^c$ caused a multipath reflection 130b that resulted in the farther object $120^f$. This is because reflected energy from the closer object $120^c$ that appears as the ghost farther object $120^f$ would have to travel a large enough distance that it would likely be attenuated. As a result, a ratio may not need to be calculated (at block 340) for a given farther object $120^f$ using one or more of the closer objects $120^c$. As previously noted, once the detection stages at blocks 305 and 325 are completed, the controller 140 may initiate a semi-autonomous or autonomous action for the vehicle 100 based on the detected objects 120 at block 250.

While the above disclosure has been described with reference to exemplary embodiments, it will be understood by those skilled in the art that various changes may be made and equivalents may be substituted for elements thereof without departing from its scope. In addition, many modifications may be made to adapt a particular situation or material to the teachings of the disclosure without departing from the essential scope thereof. Therefore, it is intended that the present disclosure not be limited to the particular embodiments disclosed, but will include all embodiments falling within the scope thereof.

What is claimed is:

1. A method comprising:
    transmitting transmit signals from two or more transmit elements of a radar system;
    receiving reflections resulting from the transmit signals at two or more receive elements of the radar system;
    processing, using processing circuitry, the reflections to obtain range-Doppler maps, each range-Doppler map corresponding with one combination of the two or more transmit elements and the two or more receive elements, wherein the range-Doppler map includes complex values that indicate intensity over a set of range values and a set of relative velocity values;
    generating, using the processing circuitry, a synthetic matrix of synthetic vectors of array response combinations for transmit angles and receive angles, each array response combination being a combination of a transmit response for one of the transmit angles and a receive response for one of the receive angles;
    performing, using the processing circuitry, two stages of detection using the range-Doppler maps and the synthetic matrix to identify real objects, the two stages of detection including a first stage to identify potential objects and a second stage to eliminate the potential objects that are ghost objects resulting from multi-path reflection, wherein the potential objects remaining after the second stage are the real objects; and
    controlling an aspect of an operation of a vehicle based on the real objects.

2. The method according to claim 1, wherein the processing the reflections includes performing a first fast Fourier transform (FFT) along range values and performing a second FFT on a result of the first FFT.

3. The method according to claim 1, wherein the generating the synthetic matrix of synthetic vectors of array response combinations includes generating the receive response for each receive angle $\theta_{RX}$ as:

$$r(\theta_{RX}) = \begin{bmatrix} e^{j2\pi p_1 \sin(\theta_{RX})/\lambda} \\ \vdots \\ e^{j2\pi p_m \sin(\theta_{RX})/\lambda} \end{bmatrix},$$

where
    $p_1$ through $p_m$ are positions of the two or more receive elements and $\lambda$ is a wavelength of the transmit signals.

4. The method according to claim 3, wherein the generating the synthetic matrix of synthetic vectors of array response combinations also includes generating the transmit response for each transmit angle $\theta_{TX}$ as:

$$b(\theta_{TX}) = \begin{bmatrix} b_1(\theta_{TX}) \\ \vdots \\ b_n(\theta_{TX}) \end{bmatrix} = \begin{bmatrix} e^{j2\pi z_1 \sin(\theta_{TX})/\lambda} \\ \vdots \\ e^{j2\pi z_n \sin(\theta_{TX})/\lambda} \end{bmatrix},$$

where
    $z_1$ through $z_n$ are positions of the two or more transmit elements.

5. The method according to claim 4, wherein the generating the synthetic matrix of synthetic vectors for each receive angle $\theta_{RX}$ and each transmit angle $\theta_{TX}$ includes obtaining each synthetic vector as:

$$a(\theta_{TX}, \theta_{RX}) = \begin{bmatrix} b_1(\theta_{TX})r(\theta_{RX}) \\ \vdots \\ b_n(\theta_{TX})r(\theta_{RX}) \end{bmatrix}.$$

6. The method according to claim 5, wherein the performing the first stage of the two stages of detection includes determining whether a beamforming result obtained using the synthetic vector with the transmit angle set equal to the receive angle and a vector x of the range-Doppler maps at each range and Doppler exceeds a detection threshold value, wherein two or more potential objects are identified at locations corresponding to each range and Doppler for which the beamforming result exceeds the detection threshold value.

7. The method according to claim 6, further comprising obtaining the beamforming result as:

$\|a^H(\theta_{TX}{}^i = \theta_{RX}{}^i, \theta_{RX}{}^i)x^i\|$, where i is an index, H indicates a Hermitian matrix, and $\|q\|$ denotes a sum of absolute values in a resulting vector q.

8. The method according to claim 7, wherein the performing the second stage of the two stages of detection includes obtaining a candidate pair of the two or more potential objects, wherein a closer one of the candidate pair is a closer one of the two or more potential objects to the radar system and a farther one of the candidate pair is a farther one of the two or more potential objects from the radar system.

9. The method according to claim 8, wherein the performing the second stage further includes determining whether a ratio exceeds a ratio threshold value, a numerator of the ratio being a beamforming result obtained using the synthetic vector with the transmit angle set equal to the receive angle of the closer one of the candidate pair and a vector of the range-Doppler maps at the range and Doppler corresponding to the farther one of the candidate pair, and a denominator of the ratio being a beamforming result obtained using the synthetic vector with the transmit angle set equal to the receive angle of the farther one of the candidate pair and a vector of the range-Doppler maps at the range and Doppler corresponding to the farther one of the candidate pair.

10. The method according to claim 9, wherein the beamforming result of the numerator is given by:

$$\|a^H(\theta_{TX}=\theta_{RX}^c, \theta_{RX}^f) x^f\|$$

and the beamforming result of the denominator is given by:

$$\|a^H(\theta_{TX}=\theta_{RX}^f, \theta_{RX}^f) x^f\|, \text{ where}$$

a subscript c indicates the closer one of the candidate pair, and a subscript f indicates the farther one of the candidate pair.

11. A system in a vehicle comprising:
two or more transmit elements of a radar system configured to emit transmit signals;
two or more receive elements of the radar system configured to receive reflections resulting from the transmit signals; and
processing circuitry configured to process the reflections to obtain range-Doppler maps, each range-Doppler map corresponding with one combination of the two or more transmit elements and the two or more receive elements, wherein the range-Doppler map includes complex values that indicate intensity over a set of range values and a set of relative velocity values, to generate a synthetic matrix of synthetic vectors of array response combinations for transmit angles and receive angles, each array response combination being a combination of a transmit response for one of the transmit angles and a receive response for one of the receive angles, and to perform two stages of detection using the range-Doppler maps and the synthetic matrix to identify real objects, the two stages of detection including a first stage to identify potential objects and a second stage to eliminate the potential objects that are ghost objects resulting from multi-path reflection, wherein the potential objects remaining after the second stage are the real objects, and an aspect of an operation of a vehicle is controlled based on the real objects.

12. The system according to claim 11, wherein the processing circuitry is configured to process the reflections by performing a first fast Fourier transform (FFT) along range values and performing a second FFT on a result of the first FFT.

13. The system according to claim 11, wherein the processing circuitry is configured to generate the synthetic matrix of synthetic vectors of array response combinations by generating the receive response for each receive angle $\theta_{RX}$ as:

$$r(\theta_{RX}) = \begin{bmatrix} e^{j2\pi p_1 \sin(\theta_{RX})/\lambda} \\ \vdots \\ e^{j2\pi p_m \sin(\theta_{RX})/\lambda} \end{bmatrix},$$

where
$p_1$ through $p_m$, are positions of the two or more receive elements and $\lambda$ is a wavelength of the transmit signals.

14. The system according to claim 13, wherein the processing circuitry is configured to generate the synthetic matrix of synthetic vectors of array response combinations by also generating the transmit response for each transmit angle $\theta_{TX}$ as:

$$b(\theta_{TX}) = \begin{Bmatrix} b_1(\theta_{TX}) \\ \vdots \\ b_n(\theta_{TX}) \end{Bmatrix} = \begin{bmatrix} e^{j2\pi z_1 \sin(\theta_{TX})/\lambda} \\ \vdots \\ e^{j2\pi z_n \sin(\theta_{TX})/\lambda} \end{bmatrix},$$

where
$z_1$ through $z_n$ are positions of the two or more transmit elements.

15. The system according to claim 14, wherein the processing circuitry is configured to generate the synthetic matrix of synthetic vectors for each receive angle $\theta_{RX}$ and each transmit angle $\theta_{TX}$ by obtaining each synthetic vector as:

$$a(\theta_{TX}, \theta_{RX}) = \begin{bmatrix} b_1(\theta_{TX}) r(\theta_{RX}) \\ \vdots \\ b_n(\theta_{TX}) r(\theta_{RX}) \end{bmatrix}.$$

16. The system according to claim 15, wherein the processing circuitry is configured to perform the first stage of the two stages of detection by determining whether a beamforming result obtained using the synthetic vector with the transmit angle set equal to the receive angle and a vector x of the range-Doppler maps at each range and Doppler exceeds a detection threshold value, wherein two or more potential objects are identified at locations corresponding to each range and Doppler for which the beamforming result exceeds the detection threshold value.

17. The system according to claim 16, wherein the beamforming result is given by:

$$\|a^H(\theta_{TX}^i=\theta_{RX}^i, \theta_{RX}^i) x^i\|, \text{ where}$$

i is an index, H indicates a Hermitian matrix, and $\|\ \|$ denotes a sum of absolute values in a resulting vector.

18. The system according to claim 17, wherein the processing circuitry is configured to perform the second stage of the two stages of detection by obtaining a candidate pair of the two or more potential objects, wherein a closer one of the candidate pair is a closer one of the two or more potential objects to the radar system and a farther one of the candidate pair is a farther one of the two or more potential objects from the radar system.

19. The system according to claim 18, wherein the processing circuitry is configured to perform the second stage by determining whether a ratio exceeds a ratio threshold value, a numerator of the ratio being a beamforming result obtained using the synthetic vector with the transmit angle set equal to the receive angle of the closer one of the candidate pair and a vector of the range-Doppler maps at the range and Doppler corresponding to the farther one of the candidate pair, and a denominator of the ratio being a beamforming result obtained using the synthetic vector with the transmit angle set equal to the receive angle of the farther one of the candidate pair and a vector of the range-Doppler maps at the range and Doppler corresponding to the farther one of the candidate pair.

20. The system according to claim 19, wherein the beamforming result of the numerator is given by:

$$\|a^H(\theta_{TX}=\theta_{RX}^c,\theta_{RX}^f)x^f\|$$

and the beamforming result of the denominator is given by:

$$\|a^H(\theta_{TX}=\theta_{RX}^f,\theta_{RX}^f)x^f\|, \text{ where}$$

a subscript c indicates the closer one of the candidate pair, and a subscript f indicates the farther one of the candidate pair.

* * * * *